Figure 1:
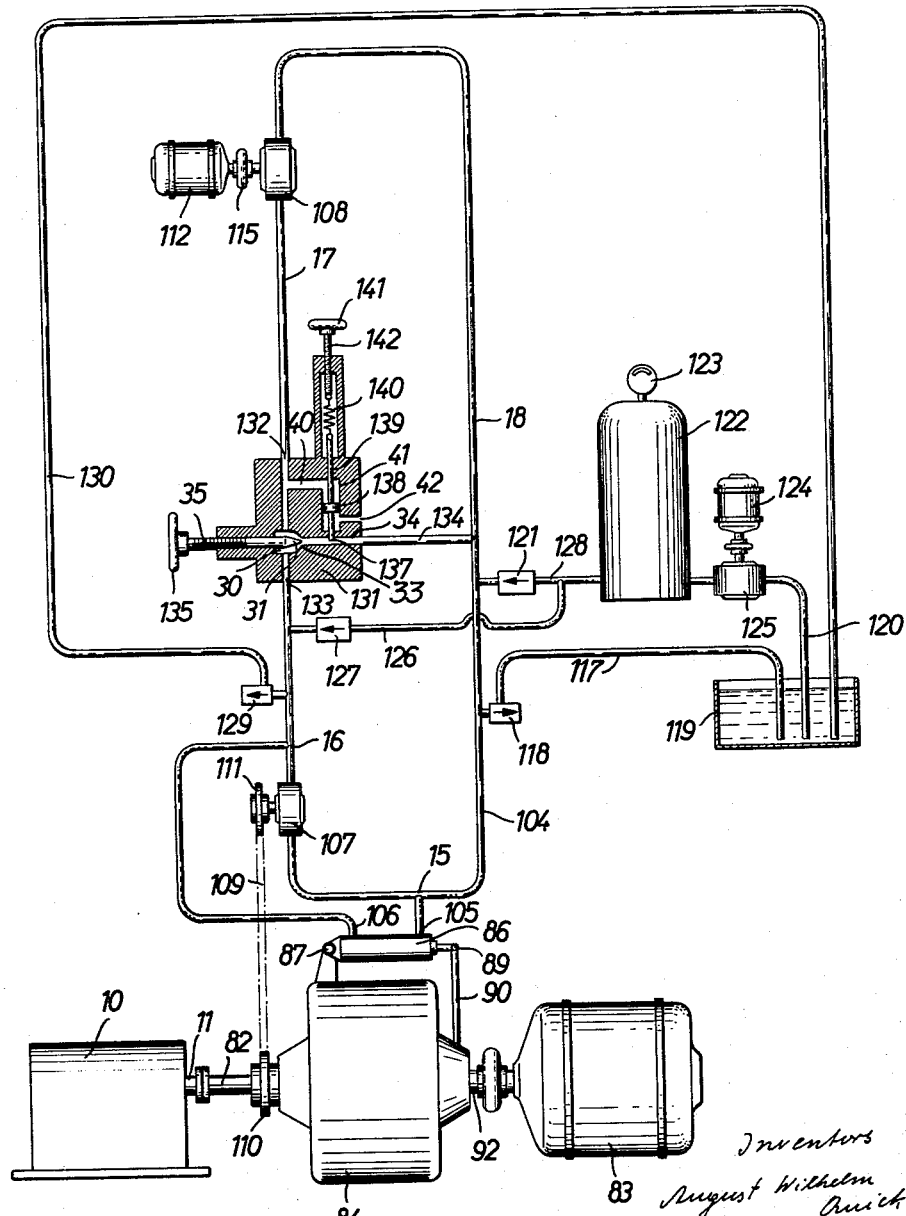

March 9, 1965 A. W. QUICK ET AL 3,172,264
HYDRAULICALLY CONTROLLED DRIVE SYSTEM
Original Filed March 7, 1957 2 Sheets-Sheet 1

United States Patent Office 3,172,264
Patented Mar. 9, 1965

3,172,264
HYDRAULICALLY CONTROLLED DRIVE SYSTEM
August Wilhelm Quick, Aachen, and Hans Lindemann, Bielefeld, Germany, assignors to Th. Calow & Co., Bielefeld, Germany
Original application Mar. 7, 1957, Ser. No. 644,516, now Patent No. 3,009,323, dated Nov. 21, 1961. Divided and this application Nov. 1, 1961, Ser. No. 149,372
Claims priority, application Germany, Mar. 28, 1956, C 12,802; Dec. 7, 1956, C 14,090; Feb. 4, 1957, C 14,342
8 Claims. (Cl. 60—54)

The present application is a divisional application of the copending application Quick et al., Serial No. 644,516, filed March 7, 1957, for "Driving Systems for Machine Tools," issued on November 21, 1961, as U.S. Patent No. 3,009,323.

The present invention relates to a hydraulically controlled drive system, and more particularly to a drive which includes fluid impelling input means and turbine means having output means whose output torque is automatically adjusted when the speed of a driven machine varies due to load fluctuations.

Certain machine tools are subjected to a variable load, but have to be driven at an exactly constant speed. It is known to drive machines of this type by adjustable drive means, such as a Ward-Leonard drive, an infinitely variable polyphase induction motor, or by a prime mover turning at constant speed and provided with an infinitely variable mechanical or hydraulic transmission.

These drives are expensive, and also the frequency of repair is comparatively high. It is one object of the present invention to overcome disadvantages of known drives for maintaining a machine tool at constant speed, and to provide a comparatively inexpensive hydraulically controlled drive system serving this purpose.

Another object of the present invention is to provide a torque-converter, or a corresponding turbine-type drive with automatically operating hydraulic means which regulate the drive to run at constant speed irrespective of the load, although the normal characteristic of such a drive would cause a speed reduction when the load is increased.

Another object of the present invention is to provide a drive system with two control pumps, one of which rotates at constant speed, while the other rotates at the speed of the driven shaft so that a pressure differential in a conduit connecting the pumps indicates a speed variation of the driven shaft.

Another object of the present invention is to provide an automatically operating control valve which automatically responds to very rapid accelerations or decelerations of the output shaft to influence the hydraulic control system.

Another object of the invention is to provide the hydraulic control system with a manually operated valve by which the control system can be set to different selected speeds of the output shaft.

With these objects in view, a drive system according to one embodiment of the invention comprises drive means, for example a torque converter whose output torque can be adjusted by turning the impeller blades, a first control pump which is driven at a selected constant speed, a second control pump which is driven from the output means of the drive means, conduit means connecting the control pumps to each other so that a liquid is circulated through the conduit means, and pressure responsive means communicating with the conduit and connected to the adjusting means of the torque converter.

When the second control pump runs at the desired speed of the controlled machine, its output equals the output of the first control pump which runs at constant speed. Consequently there is no pressure differential created in the conduit means, and the pressure responsive means and the adjusting means are not actuated.

However, if the speed of the output shaft is reduced or increased due an increase or reduction of the load torque, a pressure differential occurs at the inlet and outlet of the second control pump, and such pressure differential actuates the pressure responsive means so that the adjusting means are operated to increase, or reduce, respectively the output torque of the torque converter until a condition of equilibrium is again obtained.

For example, if the cutting tool of a bar turning or peeling machine encounters greater resistance, the load torque is increased, and the machine will tend to slow down. However, since the output torque of the torque converter is immediately increased, the additional load is overcome while the machine tool is adjusted to rotate at the desired speed.

In the preferred embodiment of the invention, a control conduit connects the outlet and the inlet of the first control pump which runs at constant speed. Valve means are provided in the control conduit for adjusting the amount of liquid passing through the same, and thereby the amount of liquid supplied by the first control pump to the second control pump.

The output of the first control pump is chosen to be substantially greater than the output of the second control pump, and a manually settable valve means in the control conduit determines the amount of liquid actually supplied by the first control pump to the second control pump, so that the hydraulic control circuit can be set to a desired selected speed of the output shaft which is then continuously and automatically maintained during the operation.

An additional automatically operating valve is also located in the control conduit, and is operated by the pressure in the conduit means to increase or reduce the cross section of the control conduit which provides a by-pass for the liquid circulated by the first control pump. If the pressure differential varies in the main conduit means due to acceleration or deceleration of the driven shaft and of the second control pump, the automatic control valve is operated by the pressure to increase the pressure further, or to reduce the pressure further so that a particularly fast adjusting action is obtained. In this manner, very rapid accelerations and decelerations of the shaft are compensated, even though they may exist only for a very short time.

In the preferred embodiment of the invention, a pressure tank, a reservoir, and a circulating pump are connected to the main conduit means to prevent excessive pressure in the conduit means.

Figure 2:
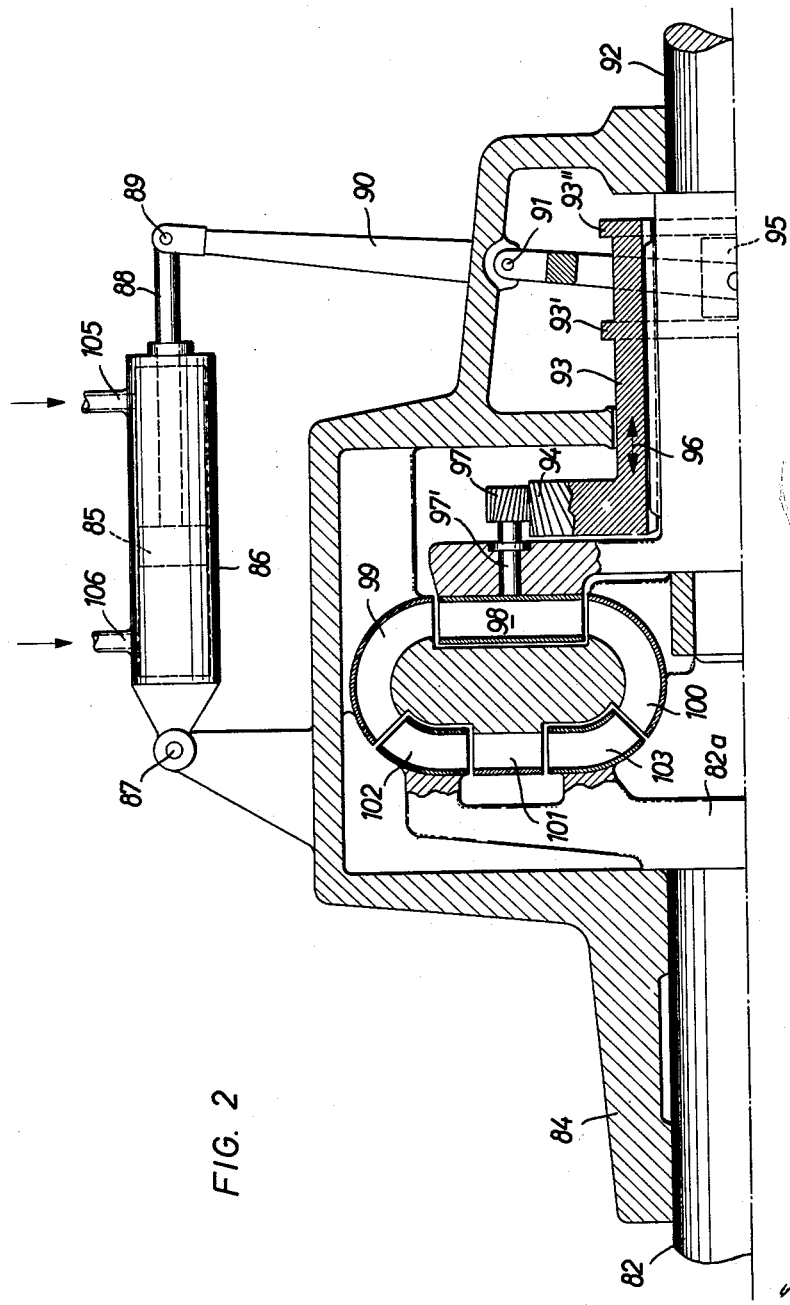

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a schematic view, partly in section, illustrating an embodiment of the invention; and FIG. 2 is a longitudinal sectional view on an enlarged scale showing a torque converter used in the embodiment of FIG. 1.

Referring now to the drawings, a prime mover 83 drives through a coupling the input shaft 92 of a torque converter 84. As best seen in FIG. 2, a bushing or sleeve 93 is mounted on input shaft 92 for axial movement, and has a pair of flanges 93' and 93" at one end, and a helical gear 94 at the other end. A lever 90 is turnably mounted on the housing by means of a pivot 91, and has a lower bifurcated arm provided with a pair of slide members 95 which slidably engage the portion of sleeve 93 between flanges 93' and 93". Consequently, by operation of lever 90, sleeve 93 can be shifted in axial direction as indicated by the arrow 96. The helical gear 94 is in meshing engagement with helical pinions 97 secured to shaft 97' which are mounted on a flange of input shaft 92. The torque converter has stationary vanes 99, 100 and 101, between which vanes 102 and 103 of a turbine wheel 82a are located. The turbine wheel is fixed on the output shaft 82. Impeller blades 98 are secured to shaft 97', so that upon operation of lever 90 and shifting of sleeve 93, the impeller blades 98 are turned to adjust the output torque of the output means 82, 82a.

A piston rod 88 is connected by a pivot pin 89 to lever 90, and carries a piston 85 located in a cylinder 86 which is pivotally mounted on a pivot means 87. Conduits 105 and 106 are connected to the chambers formed by piston 85 in cylinder 86, and it is apparent that if liquid is applied through conduit 105, piston 85 will move to the left, and that when liquid is supplied through conduit 106, piston 85 will move to the right as viewed in FIG. 2, to effect a corresponding adjustment of the impeller blades 98 to increase or decrease the output torque of shaft 82 relative to the normal output torque obtained in an intermediate position of piston 85.

FIG. 1 shows that conduits 105 and 106 are connected to a conduit means 104 at two spaced points 15 and 16. The inlet of a pump 107 is located in the region of point 16 and its outlet is located in the region of point 15. Pump 107 is driven from shaft 82 by a chain drive including chain wheels 110 and 111, and a chain 109. Consequently, pump 107 will rotate at a speed proportional to the speed of output shaft 82. Output shaft 82 drives through a coupling the shaft 11 of a machine tool 10, so that if the speed of output shaft 82 varies due to load variations of machine tool 10, pump 107 will rotate at correspondingly changed speeds. Consequently, the output of control pump 107 will be a measure of the rotary speed of shaft 82 and 11. Another pump 108 is located in conduit 104, and has an outlet pumping into part 17 of conduit 104 which is connected to the inlet of pump 107. The inlet of pump 108 is connected to conduit part 18 which leads to the outlet of pump 107.

Control pump 108 is driven through a coupling 115 from an electric motor 112 which maintains pump 108 at a constant speed. The output of control pump 108 is considerably higher than the output of control pump 107, for example twice as high.

A control conduit 134 connects parts 17 and 18 of conduit 104 is formed with a passage forming a portion of conduit part 17, and including a duct 132, another duct 133, and a chamber 30. Another duct 34 in valve body 131 forms a portion of control conduit 134.

Duct 34 has a valve seat 33 in the region of chamber 30, and a needle valve 31 cooperates with valve seat 33. Needle valve 31 is part of a threaded spindle 35 which can be operated by handwheel 135 so that the open cross section of control conduit 134 can be determined by operation of needle valve 31 by handwheel 135. Means indicating various speeds may be provided in the region of handwheel 135, and assuming that wheel 135 is set to a selected speed at which shaft 82 is to run, a certain cross section will be left free by needle valve 31 in control conduit 134. Consequently not all the output of pump 108 will be pumped to pump 107, but a part of the liquid will be recirculated through conduit 134, and the amount and volume of this part of the liquid can be selected by setting valve 31.

Assuming that shaft 82 is to run at the desired speed, pump 107 will pump a volume corresponding to this desired speed. Pump 108 will pump greater volume, but valve 31 is set to such a position that the same volume passes from 108 to 107 as pump 107 is capable of pumping at the desired selected speed. Consequently as long as pump 107 runs at the desired speed, no liquid will be pumped into conduits 105 or 106, and piston 85 will remain in its normal position. However, when pump 107 runs slower, or faster corresponding to a deceleration or acceleration of shaft 82 due to a load variation, piston 85 will be shifted. For example, if the output of pump 107 is increased, liquid will be pumped through conduit 105 into cylinder 86 and displace the piston to the left to effect an adjustment of the torque converter by which its output torque is reduced so that the speed drops again until the desired speed is again obtained.

If valve 31 is set to permit more liquid to pass from pump 108 to pump 107, then pump 107 will have to run faster to obtain the condition of equilibrium, corresponding to a different selected higher speed of shaft 82.

In this manner, a desired speed of rotation of machine 10 is selected by setting valve means 135, 35, 31.

In the above explanation of the operation of control pump 107, 108 and valve 31, it was assumed that conduit 104 provides a closed circuit. However, to avoid excess pressure in conduit 104, under certain operational conditions, a reservoir 119, a pressure tank 122, and a circulating pump 124 are provided. A conduit 117 with a check valve 118 connects conduit part 118 with the reservoir 119. A conduit 130 with a check valve 129 connects conduit part 17 with the reservoir 119. Consequently, when pump 107 rotates so fast that the amount of liquid pumped thereby cannot be taken up by pump 108, liquid will pass through check valve 118 and conduit 117 into the reservoir 119, while when pump 108 pumps too much liquid, the liquid will pass through check valve 129 and conduit 130 into the reservoir 119. Circulation pump 125 is driven by a motor 124 to pump liquid from the reservoir 119 through conduit 120 into pressure tank 122 which contains air, and whose pressure is indicated by a manometer 123. A conduit 128 includes a check valve 121 and connects pressure tank 122 with conduit part 18. Another conduit 126 has a check valve 127 and connects pressure tank 122 with conduit part 17. If pump 108 sucks more liquid out of conduit portion 18 than pump 107 can supply at the momentary speed of shaft 82, liquid is supplied from pressure tank 122 through conduit 128 and check valve 121, and conduit 126 in check valve 122 perform the corresponding function for conduit portions 17.

Valve body 131 has another duct 40 communicating with conduit part 17 and opening into a cylinder space 41 which is vented at 42. A piston 138 is located in cylinder 41 and carries a valve member 137 which projects into the duct 34 of control conduit 134. A piston rod 139 is connected to piston 138 and secured to a spring 140 whose tension can be adjusted by threaded spindle 142 carrying a handwheel 141. When pumps 107 and 108 pump the same volume of liquid, spring 104 will hold valve member 137 in a normal position. When the pressure in conduit portion 17 becomes greater, the increased pressure in duct 40 and cylinder 41 will move the valve member 137 to reduce the cross section of control conduit 134. Consequently, less liquid can be recirculated through conduit 134 to pump 108, and as a result, the pressure in conduit part 17 is further increased, and even more liquid is pumped by pump 108 into conduit 106 to effect a displacement of piston 85 to the right. Even without valve member 137, piston 85 will be operated by a liquid pumped through conduit 106 by control pump 108 if the speed of control pump 107 drops, but due to the fact that valve 137 becomes automatically effective to increase the amount of liquid pumped by pump 108 into conduit 106, the adjustment will be much faster so that a rapid acceleration of shafts 11, 82 will be much faster compensated by the additional action of control valve 137.

Of course, if shaft 82 runs too fast, and pump 107 pumps more liquid than can be absorbed by pump 108, then this liquid will enter through conduit 105 in the right chamber of cylinder 86 and displace piston 85 to the left to reduce the output torque of shaft 82 under these conditions, pump 107 will pump more liquid out of conduit part 17 than pump 108 can supply, and consequently, the pressure in the cylinder 41 will drop, and the force of spring 140 will prevail to retract valve member 137 so that the cross section of control conduit 134 is increased, and a greater amount of liquid can flow through control conduit 134 back to pump 108. Pump 107 will receive even less liquid through conduit part 17, and will draw liquid through conduit 106 out of the left space in cylinder 86 whereby the adjustment of the torque converter is more rapidly effected as compared with an arrangement without control valve 137.

The pressure differential between points 15 and 16 will determine the speed and direction of the control movement of piston 85, and as will be apparent from the above description of the operation of the control pumps 107, 108, such pressure differential will only occur when shaft 82 runs faster, or slower, than a desired speed since otherwise control pumps 107 and 108 pump equal amounts of liquid through conduit parts 17, 18, so that no liquid is pumped through conduits 105 and 106. If shaft 82 runs at an improper speed for such a time that one of the control pumps produces an excess of liquid beyond the full capacity of cylinder 86, one of the check valves 118 or 129 will open and excess liquid will flow into the reservoir 119 so that excess pressure in conduit 104 is safely prevented. In a corresponding manner, if one of the control pumps tends to create a vacuum in the conduit means 104, liquid will be supplied from the pressure tank 122 through one of the check valves 121 and 127.

The drive system of the invention is operated in the following manner. First motor 112, which is either an asynchronous motor, or a synchronous motor, is switched on and drives pump 108 which pumps liquid into conduit part 17. Since torque converter 84 and pump 107 are still at a standstill, the liquid pumped by pump 108 passes through conduit 106 into the lefthand space of cylinder 86 and moves piston 85 all the way to the right so that the torque converter is set to produce a maximum output torque, resulting in rapid acceleration of machine tool 10. Since the pressure in conduit part 17 is high, piston 138 will be displaced in cylinder 41 and close control conduit 134. Excess pressure will be produced in conduit part 17 when piston 85 is in its end position, so that check valve 129 will open and control pump 108 will discharge through conduit 130 into reservoir 119. At the same time, liquid will be supplied from pressure tank 122 through conduit 128, check valve 121 and conduit part 18 to the inlet of control pump 108. Pump 125 maintains the pressure in tank 122, and provides the liquid from reservoir 119. As soon as the prime mover motor 83 is switched on, torque converter will drive machine tool 10 with the maximum output torque and accelerate shaft 82 so that pump 107 starts to operate at increasing speeds. When control pump 107 has reached such a speed that it pumps slightly more liquid from conduit part 17 than is supplied by control pump 108 in the particular position of valve 31, control pump 107 will pump liquid out of the lefthand space in cylinder 86 through conduit 106, and at the same time pump liquid through conduit 105 into the righthand space of cylinder 86, since more liquid is discharged by the outlet of pump 107 than can be sucked in through conduit part 18 by the inlet of control pump 108. Consequently, piston 85 moves from its end position at the right end of cylinder 86 toward its normal position, so that the output torque of torque converter 84 is reduced, resulting in a reduction of the speed of shaft 82, and consequently of control pump 107 until the desired speed is obtained at which pump 107 and pump 108 pump the same amount of liquid so that no pressure differential develops between points 15 and 16 of conduit means 104.

If during the operation load variations occur at machine tool 10, and the speed of shaft 82 is reduced and increased, a pressure differential will develop at points 15 and 16, and piston 85 will be shifted to effect a corresponding adjustment of the output torque of a torque converter. Whenever such pressure differential occurs, the pressure in conduit part 17 will either be increased, or decreased, and control valve 137 will immediately react to even further increase, or further decrease the pressure differential between points 15 and 16, so that piston 85 will be more rapidly shifted than in an arrangement in which control valve 137 would not be provided.

From the above description of the hydraulic control system of the present invention, it will become apparent that the control pumps 107 and 108 and control conduit 104 constitute a speed responsive control means, while control valve 137 constitutes a control device which is responsive to rapid acceleration or deceleration of the output shaft.

Although the drive system of the present invention has been described as driving a machine tool, it will be appreciated that any machine subjected to a variable load can be controlled to run at constant speed by the drive system of the invention.

It will be understood that each of the elements described above or two or more together, may also find a useful application in other types of drive systems differing from the types described above.

While the invention has been illustrated and described as embodied in a hydraulically controlled drive system including a control pump running at constant speed, and a control pump running at a speed of a shaft which is subjected to a variable load, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A drive system comprising, in combination, drive means including output means and adjusting means for adjusting the output torque of said output means; a shaft driven by said output means and adapted to drive a machine subjected to a variable load; a first control pump; means for driving said first control pump at a selected constant speed; a second control pump; means for driving said second control pump from said shaft; conduit means connecting the outlet of said first control pump with the inlet of said second control pump and the outlet of said second control pump with the inlet of said first control pump whereby an operating liquid is circulated through said conduit means so that the pressures at said inlet and outlet of said second control pump are equal when said shaft runs at a desired speed; and a pressure responsive means having chamber means communicating with said conduit means at two points located in the region of said inlet and outlet of said second control pump, respectively, said pressure responsive means including a movable control element moving in opposite directions when the pressure at any of said points exceeds the pressure at the other of said points, said control element being operatively connected to said adjusting means so that said output means is adjusted to produce a greater or smaller output torque when a pressure differential at said points is caused by a speed change of said shaft, and thereby of said second control pump, due to a load variation.

2. A drive system as set forth in claim 1 and including a pressure tank adapted to contain air; a reservoir; a circulation pump for pumping a liquid from said reservoir into said pressure tank; a first conduit connecting the outlet of said first pump with said reservoir and including a check valve; a second conduit connecting the outlet of said second control pump with said reservoir and including a check valve, said check valves permitting passage of liquid from said conduit means into said pressure tank; a third conduit connecting said pressure tank with the inlet of said first control pump and including a check valve blocking passage of liquid into said pressure tank; and a fourth conduit connecting said pressure tank with the inlet of said second control pump and including a check valve blocking passage of liquid into said pressure tank.

3. A drive system comprising, in combination, drive means including output means and adjusting means for adjusting the output torque of said output means; a shaft driven by said output means and adapted to drive a machine subjected to a variable load; a first control pump; means for driving said first control pump at a selected constant speed; a second control pump having a smaller output than said first control pump; means for driving said second control pump from said shaft; conduit means connecting the outlet of said first control pump with the inlet of said second control pump and the outlet of said second control pump with the inlet of said first control pump whereby an operating liquid is circulated through said conduit means so that the pressures at said inlet and outlet of said second control pump are equal when said shaft runs at a desired speed; a control conduit connecting the outlet and the inlet of said first control pump; manually settable valve means in said control conduit for adjusting the amount of liquid passing through the same and thereby the amount of liquid supplied by said first control pump to the inlet of said second control pump; and a pressure responsive means having chamber means communicating with said conduit means at two points located in the region of said inlet and outlet of said second control pump, respectively, said pressure responsive means including a movable control element moving in opposite directions when the pressure at any of said points exceeds the pressure at the other of said points, said control element being operatively connected to said adjusting means so that said output means is adjusted to produce a greater or smaller output torque when a pressure differential at said points is caused by a speed change of said shaft, and thereby of said second control pump, due to a load variation.

4. A drive system comprising, in combination, drive means including output means and adjusting means for adjusting the output torque of said output means; a shaft driven by said output means and adapted to drive a machine subjected to a variable load; a first control pump; means for driving said first control pump at a selected constant speed; a second control pump having a smaller output than said first control pump; means for driving said second control pump from said shaft; conduit means connecting the outlet of said first control pump with the inlet of said second control pump and the outlet of said second control pump with the inlet of said first control pump whereby an operating liquid is circulated through said conduit means so that the pressures at said inlet and outlet of said second control pump are equal when said shaft runs at a desired speed; a control conduit connecting the outlet and the inlet of said first control pump; manually settable valve means in said control conduit for adjusting the amount of liquid passing through the same and thereby the amount of liquid supplied by said first control pump to the inlet of said second control pump; hydraulically operated control valve means located in said control conduit communicating with said conduit means and controlled by the pressure in the same to automatically increase or reduce the cross section of said control conduit when the pressure in said conduit means is reduced or increased, respectively, whereby the pressure in said conduit means is further reduced or increased, respectively; and a pressure responsive means having chamber means communicating with said conduit means at two points located in the region of said inlet and outlet of said second control pump, respectively, said pressure responsive means including a movable control element moving in opposite directions when the pressure at any of said points exceeds the pressure at the other of said points, said control element being operatively connected to said adjusting means so that said output means is adjusted to produce a greater or smaller output torque when a pressure differential at said points is caused by a speed change of said shaft, and thereby of said second control pump, due to a load variation.

5. A drive system comprising, in combination, drive means including output means and adjusting means for adjusting the output torque of said output means; a shaft driven by said output means and adapted to drive a machine subjected to a variable load; a first control pump; means for driving said first control pump at a selected constant speed; a second control pump; means for driving said second control pump from said shaft; conduit means connecting the outlet of said first control pump with the inlet of said second control pump and the outlet of said second control pump with the inlet of said first control pump whereby an operating liquid is circulated through said conduit means so that the pressures at said inlet and outlet of said second control pump are equal when said shaft runs at a desired speed; and a pressure responsive means including a cylinder, a piston in said cylinder forming two chambers in said cylinder on opposite sides thereof, and two conduits respectively connecting said chambers to two points of said conduit means located in the region of said inlet and outlet of said second control pump, respectively, said piston moving in opposite directions when the pressure at any of said points exceeds the pressure at the other of said points, said piston being operatively connected to said adjusting means so that said output means is adjusted to produce a greater or smaller output torque when a pressure differential at said points is caused by a speed change of said shaft, and thereby of said second control pump, due to a load variation.

6. A drive system comprising, in combination, drive means including output means and adjusting means for adjusting the output torque of said output means; a shaft driven by said output means and adapted to drive a machine subjected to a variable load; a first control pump; means for driving said first control pump at a selected constant speed; a second control pump having a smaller output than said first control pump; means for driving said second control pump from said shaft; conduit means connecting the outlet of said first control pump with the inlet of said second control pump and the outlet of said second control pump with the inlet of said first control pump whereby an operating liquid is circulated through said conduit means so that the pressures at said inlet and outlet of said second control pump are equal when said shaft runs at a desired speed; a control conduit connecting the outlet and the inlet of said first control pump; manually settable valve means in said control conduit for adjusting the amount of liquid passing through the same and thereby the amount of liquid supplied by said first control pump to the inlet of said second control pump; hydraulically operated control valve means located in said control conduit communicating with said conduit means and controlled by the pressure in the same to automatically increase or reduce the cross section of said control conduit when the pressure in said conduit means is reduced or increased, respectively, whereby the pressure in said conduit means is further reduced or increased, respectively; and a pressure responsive means including a cylinder, a piston in said cylinder forming two chambers in said cylinder on opposite sides thereof, and two conduits respectively connecting said chambers to two points of said conduit means located in the region of said inlet and outlet of said second control pump, respectively, said piston moving in opposite directions when the pressure at any of said points exceeds the pressure at the other of said points, said piston being operatively connected to said adjusting means so that said output means is adjusted to produce a greater or smaller output torque when a pressure differential at said points is caused by a speed change of said shaft, and thereby of said second control pump, due to a load variation.

7. A drive system comprising, in combination, prime mover means; drive means including fluid impelling input means driven by said prime mover means, turbine means having rotary output means, and adjusting means for adjusting the output torque of said output means; a shaft driven by said output means and adapted to drive a machine subjected to a variable load; a first control pump; means for driving said first control pump at a selected constant speed; a second control pump; means for driving said second control pump from said shaft; conduit means connecting the outlet of said first control pump with the inlet of said second control pump and the outlet of said second control pump with the inlet of said first control pump whereby an operating liquid is circulated through said conduit means so that the pressures at said inlet and outlet of said second control pump are equal when said shaft runs at a desired speed; a control conduit connecting the outlet and the inlet of said first control pump; hydraulically operated control valve means located in said control conduit communicating with said conduit means and controlled by the pressure in the same to automatically increase or reduce the cross section of said control conduit when the pressure in said conduit means is reduced or increased, respectively, whereby the pressure in said conduit means is further reduced or increased, respectively; and a pressure responsive means having chamber means communicating with said conduit means at two points located in the region of said inlet and outlet of said second control pump, respectively, said pressure responsive means including a movable control element moving in opposite directions when the pressure at any of said points exceeds the pressure at the other of said points, said control element being operatively connected to said adjusting means so that said output means is adjusted to produce a greater or smaller output torque when a pressure differential at said points is caused by a speed change of said shaft, and thereby of said second control pump, due to a load variation.

8. A drive system comprising, in combination, prime mover means; drive means including fluid impelling input means driven by said prime mover means, turbine means having rotary output means, and adjusting means for adjusting the output torque of said output means; a shaft driven by said output means and adapted to drive a machine subjected to a variable load; a first control pump; means for driving said first control pump at a selected constant speed; a second control pump having a smaller output than said first control pump; means for driving said second control pump from said shaft; conduit means connecting the outlet of said first control pump with the inlet of said second control pump and the outlet of said second control pump with the inlet of said first control pump whereby an operating liquid is circulated through said conduit means so that the pressures at said inlet and outlet of said second control pump are equal when said shaft runs at a desired speed; a control conduit connecting the outlet and the inlet of said first control pump; manually settable valve means in said control conduit for adjusting the amount of liquid passing through the same and thereby the amount of liquid supplied by said first control pump to the inlet of said second control pump; hydraulically operated control valve means located in said control conduit communicating with said conduit means and controlled by the pressure in the same to automatically increase or reduce the cross section of said control conduit when the pressure in said conduit means is reduced or increased, respectively, whereby the pressure in said conduit means is further reduced or increased, respectively; and a pressure responsive means including a cylinder, a piston in said cylinder forming two chambers in said cylinder on opposite sides thereof, and two conduits respectively connecting said chambers to two points of said conduit means located in the region of said inlet and outlet of said second control pump, respectively, said piston moving in opposite directions when the pressure at any of said points exceeds the pressure at the other of said points, said piston being operatively connected to said adjusting means so that said output means is adjusted to produce a greater or smaller output torque when a pressure differential at said points is caused by a speed change of said shaft, and thereby of said second control pump, due to a load variation.

References Cited in the file of this patent

UNITED STATES PATENTS

| | | |
|---|---|---|
| 2,291,011 | Vickers | July 28, 1942 |
| 2,382,034 | Wemp | Aug. 14, 1945 |
| 2,492,720 | Tyler | Dec. 27, 1949 |
| 2,505,727 | Vickers et al. | Apr. 27, 1950 |
| 2,739,447 | Newell | Mar. 27, 1956 |
| 2,768,636 | Postel et al. | Oct. 30, 1956 |
| 2,805,549 | Hensleigh et al. | Sept. 10, 1957 |